Dec. 10, 1946.  O. W. GREENE ET AL  2,412,506
MEANS FOR BLENDING FIBERS
Filed May 1, 1945  7 Sheets-Sheet 5
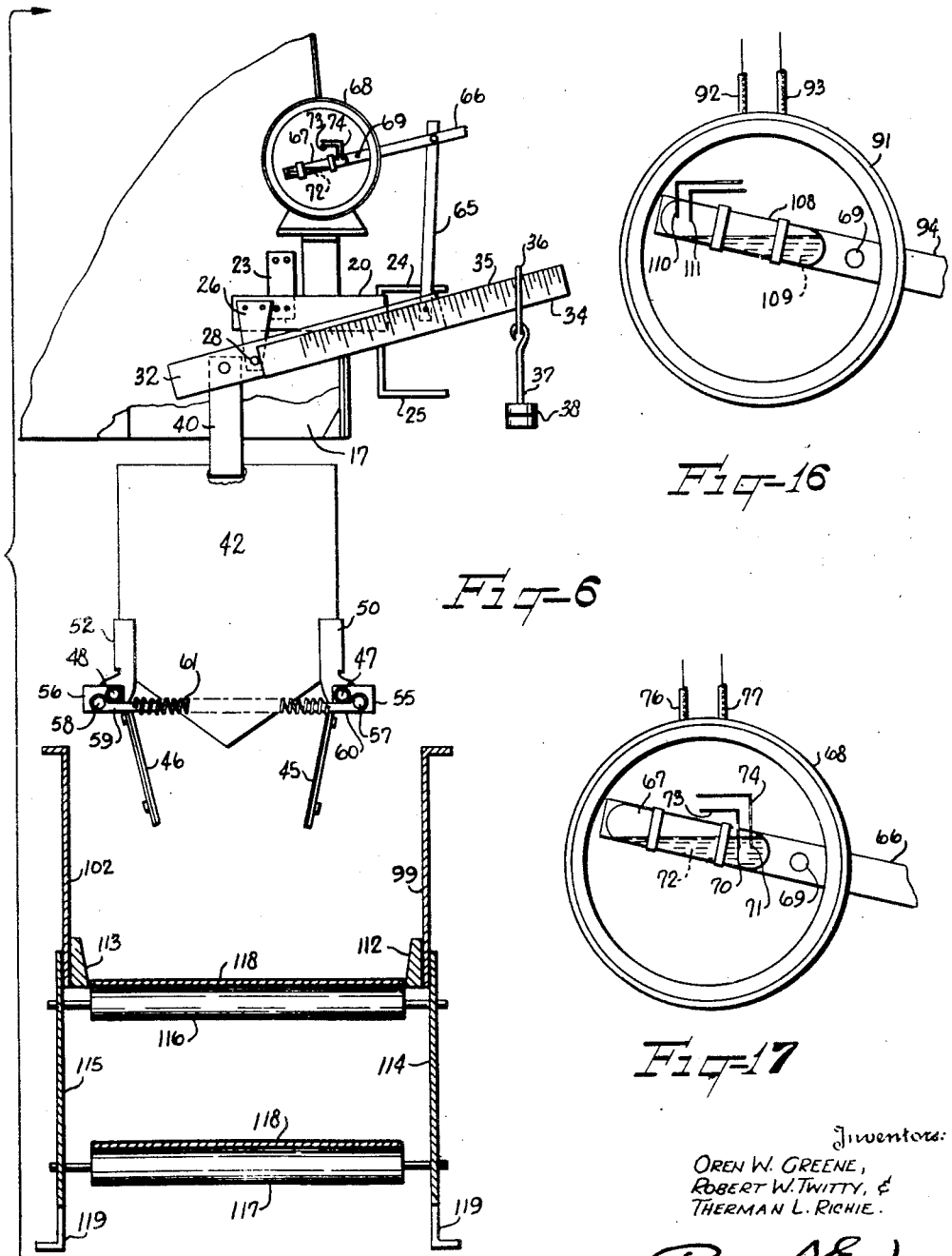

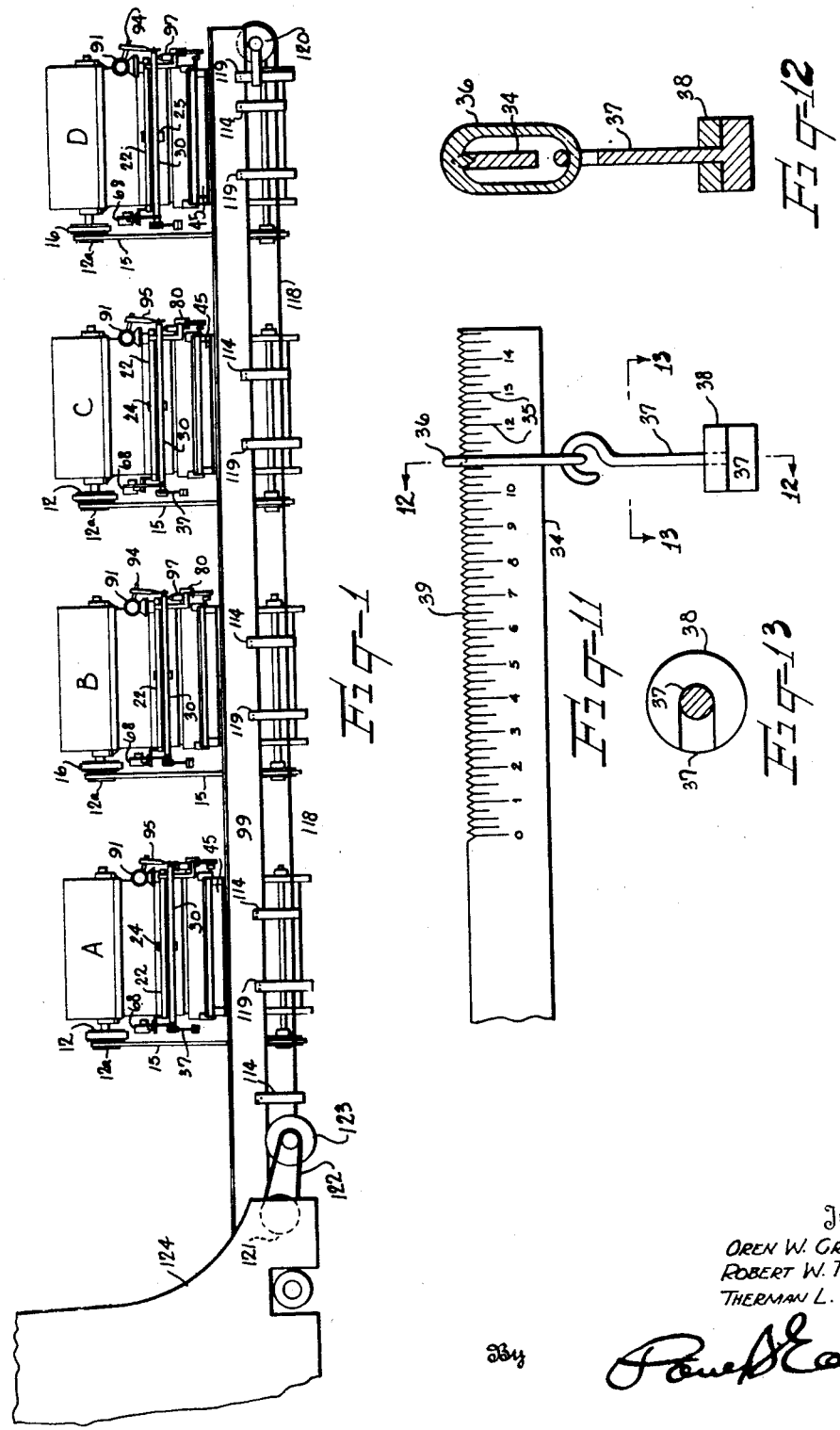

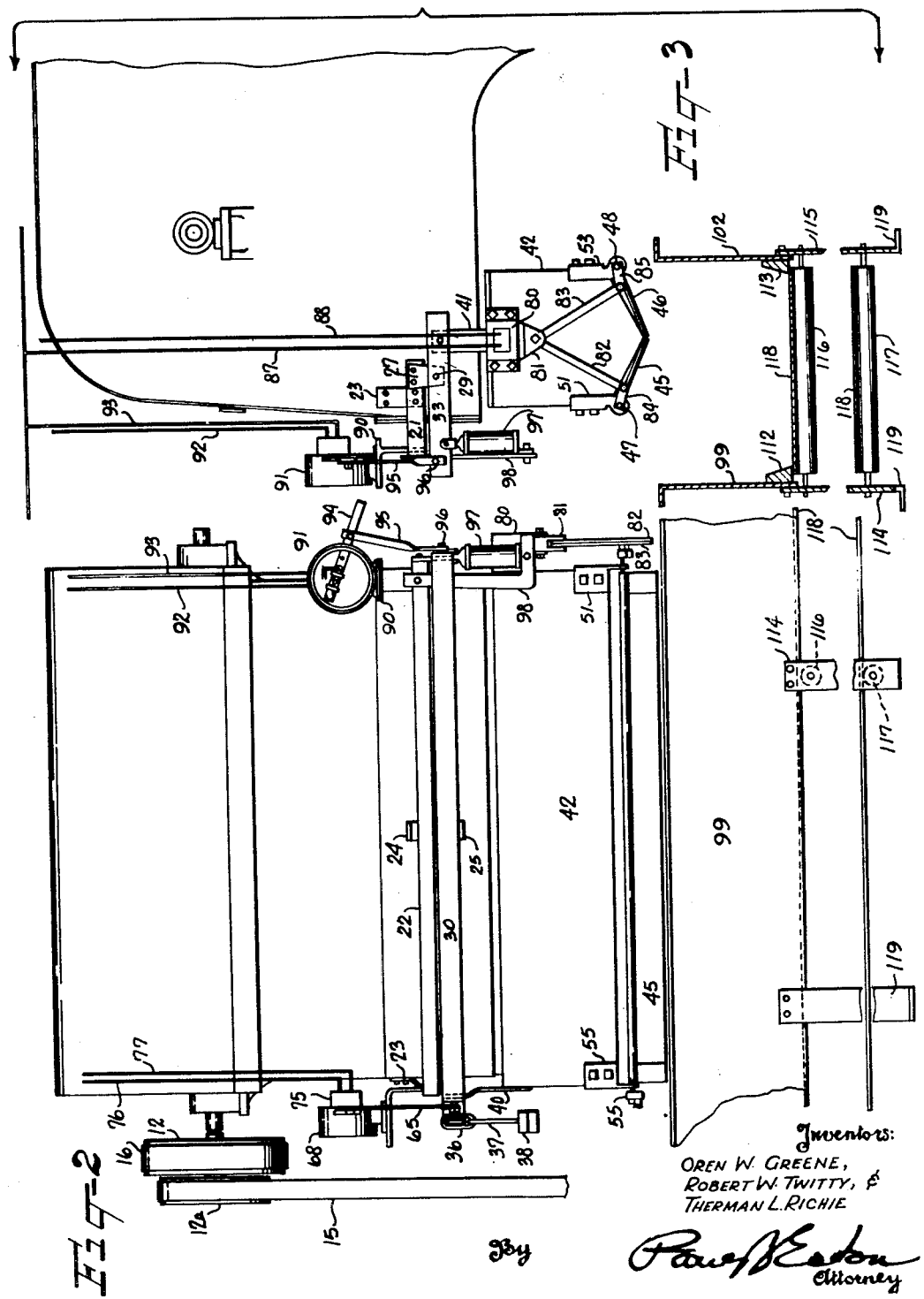

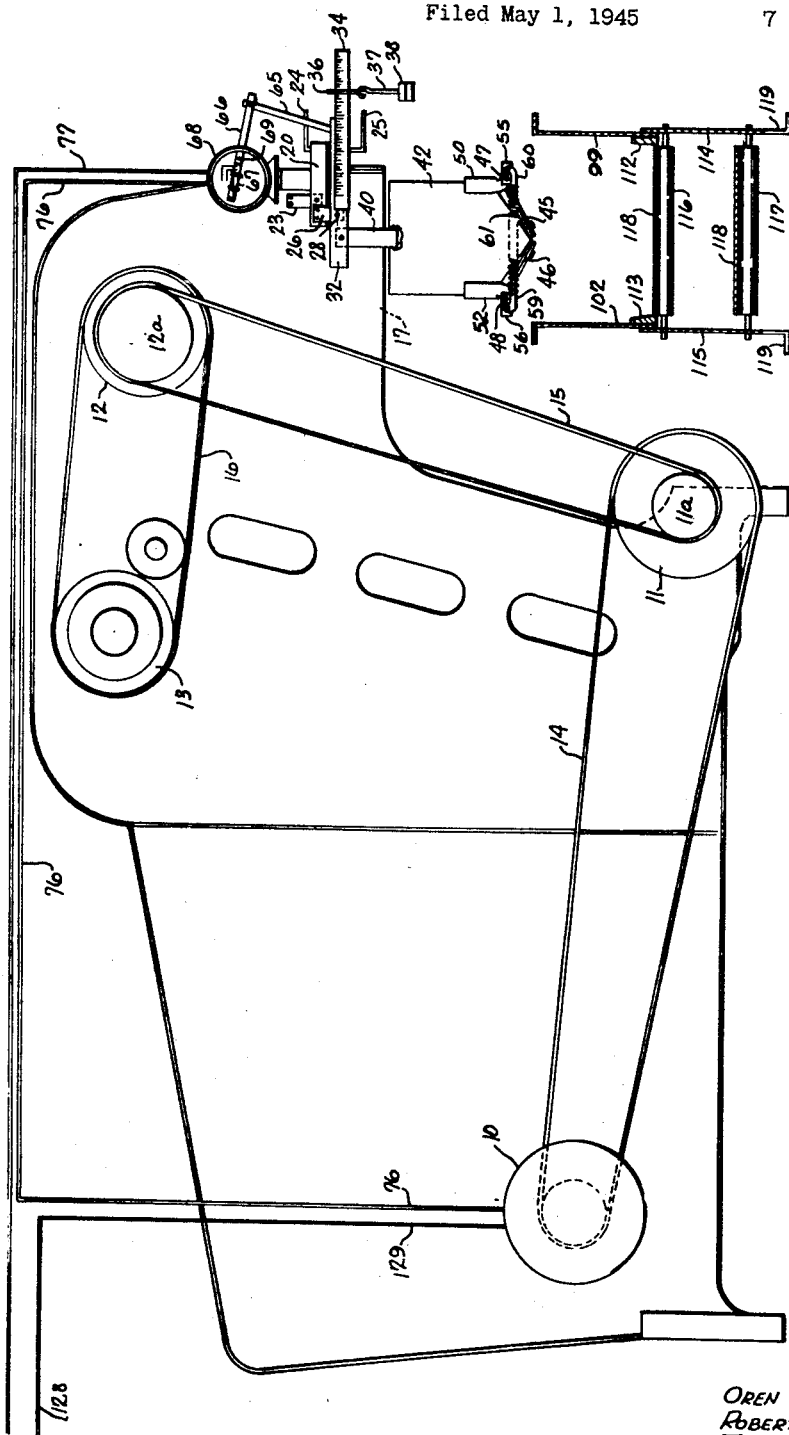

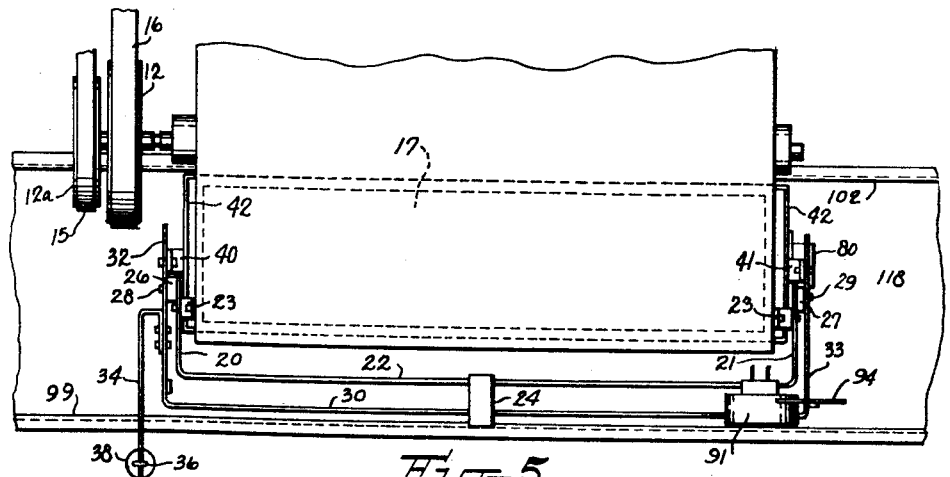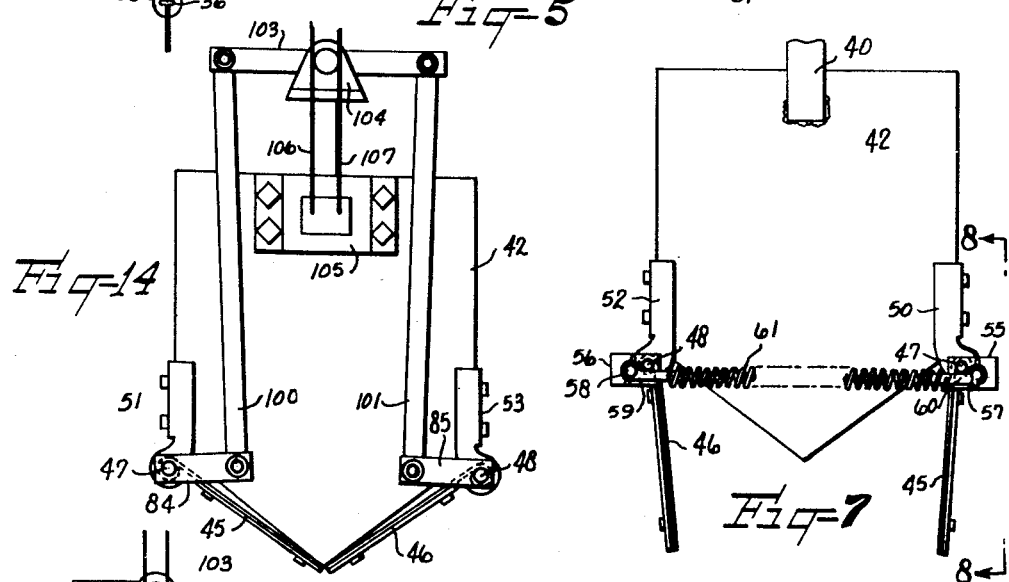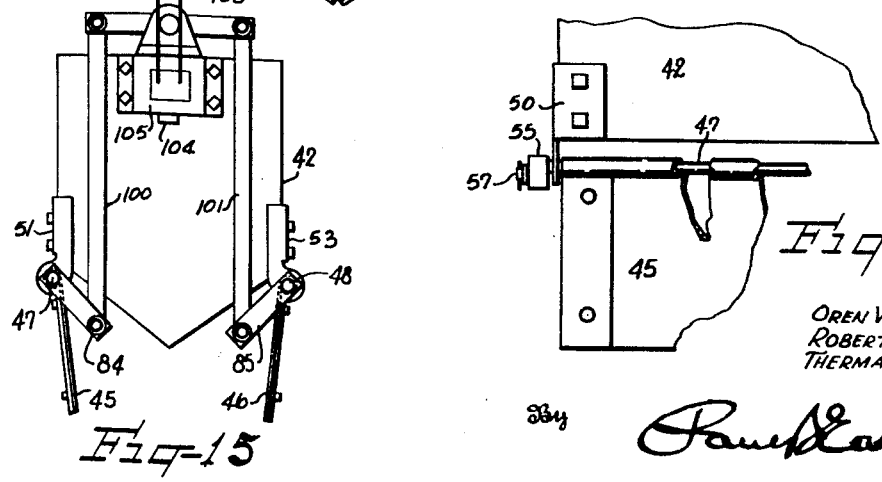

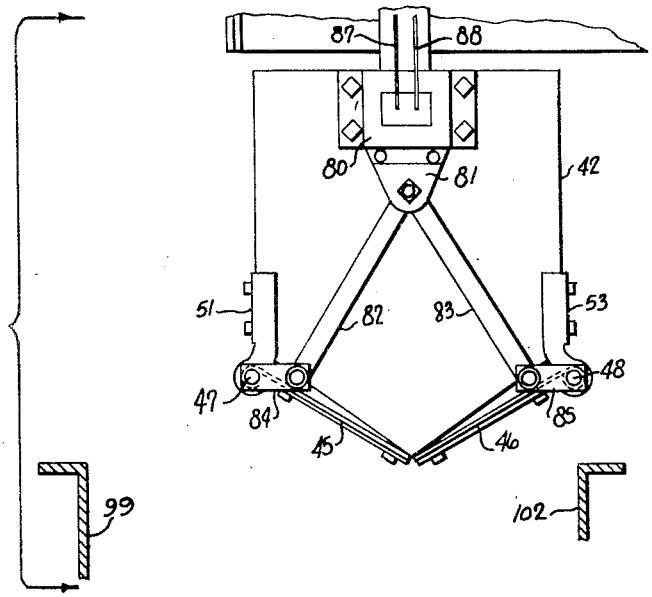
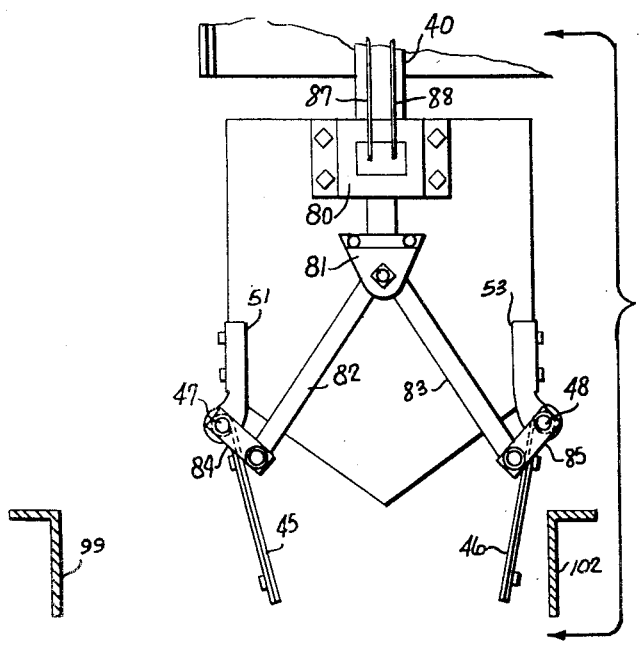

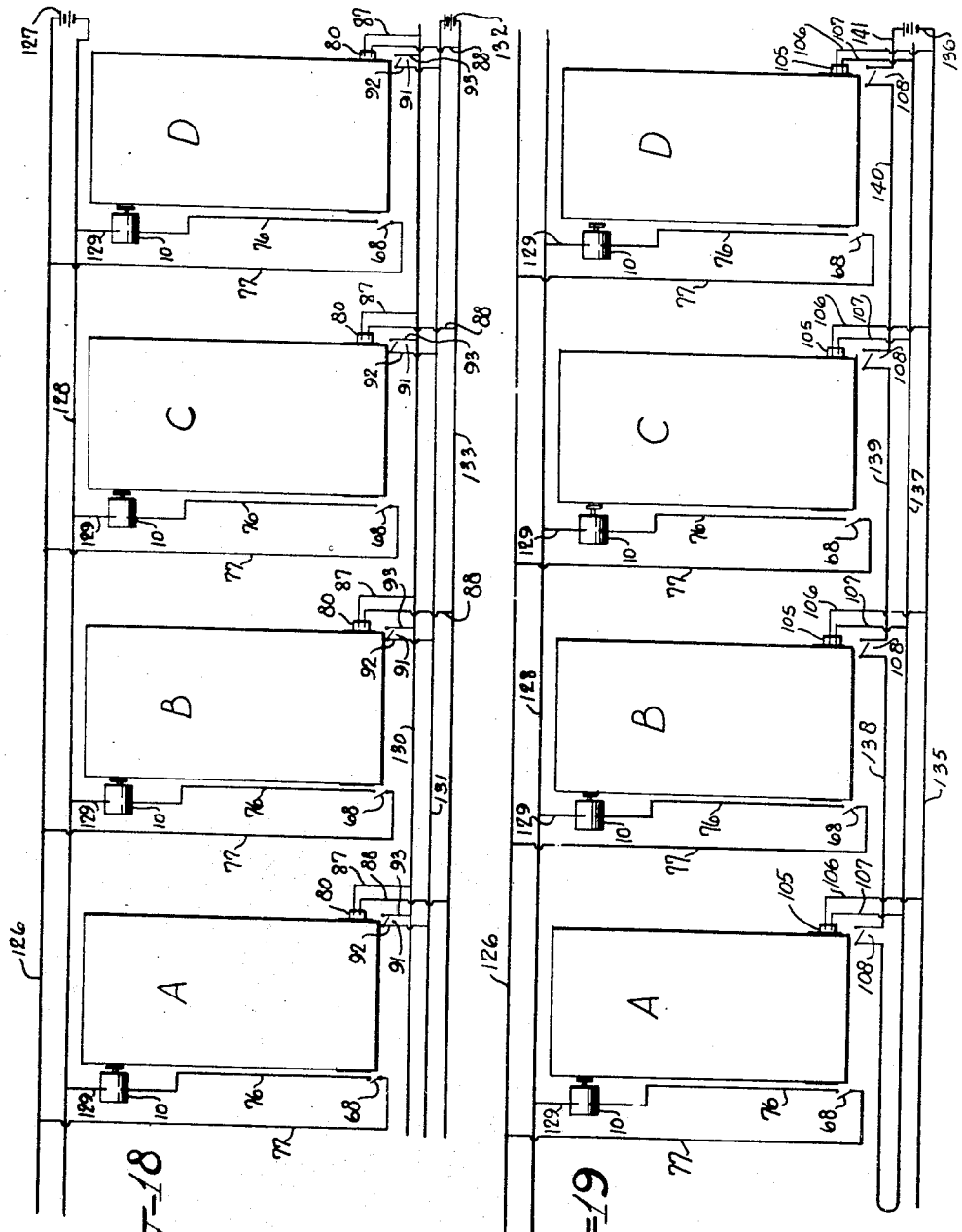

Patented Dec. 10, 1946

2,412,506

UNITED STATES PATENT OFFICE 2,412,506

MEANS FOR BLENDING FIBERS

Oren W. Greene, Robert W. Twitty, and Therman L. Richie, Marion, N. C., assignors to Marion Manufacturing Company, Marion, N. C., a corporation of North Carolina Application May 1, 1945, Serial No. 591,384

7 Claims. (Cl. 19—69)

1

This invention relates to a method and apparatus for the blending of fibers and more especially to a plurality of fiber preparation machines adapted to deliver certain quantities of fibers into a common conveyor with means for automatically stopping each machine when a predetermined quantity of fibers has been processed and holding the fibers ready for delivery position and continuing operating the other machines until each of the machines has processed a given amount of fibers, at which time all of the fibers processed by the various machines are dumped simultaneously into a suitable conveyor to be conveyed to another processing machine for mixing and blending the various fibers delivered.

It is an object of this invention to provide in apparatus for processing fibers such as a plurality of feeders, means for catching the fibers processed by each of the feeders and holding the fibers and stopping the particular machine when a predetermined quantity of fibers has been processed by the machine, and continuing the operations of the other machines until a predetermined amount of fibers has been processed thereby, all of the machines being equipped with means for catching and holding the fibers until all of the machines have processed a predetermined quantity of fibers, then said means being automatically operable to dump all of the fibers, which have previously been processed by the machines, into a suitable conveyor to convey the combined fibers into a suitable blending machine for mixing the same to thereby blend a plurality of different fibers into one common lot of fibers.

It is another object of this invention to provide means associated with a fiber preparation machine for catching and retaining the processed fibers and means governed by the weight of the fibers processed for automatically stopping the machines when a predetermined number of pounds of the fibers have been processed.

It is another object of this invention to provide a plurality of feeders for processing fibers and associating with the discharge end of each of the feeders a container for catching the processed fibers, with means controlled by the weight of the fibers within the container for automatically stopping the machine when a predetermined poundage has been collected in the container, together with a plurality of other feeders, each equipped with a container and being adapted to be stopped in operation when a predetermined poundage of fibers has passed through the feeder and delivered into its container, together with

2 means for automatically removing from the containers all of the retained fibers therein, when the last of a plurality of interconnected machines have processed its predetermined amount of fibers, so that all of the various batches of fibers held in the various containers will be delivered simultaneously to a suitable fiber processing machine for mixing the various batches of fibers together to form a blended batch of fibers.

Some of the objects of the invention having been stated, other objects will appear as the description proceeds when taken in connection with the accompanying drawings in which:

Figure 1 is a front elevation of a plurality of feeders equipped with the invention and showing a common conveyor for receiving the fibers processed by the plurality of feeders and conveying the same to another machine;

Figure 2 is a front elevation of one of the machines and the portion of the conveyor as shown in Figure 1;

Figure 3 is an end elevation looking at the right hand end of Figure 2;

Figure 4 is a view looking at the left hand side of one of the feeders in Figure 1 and showing the other end of the invention from that shown in Figure 3;

Figure 5 is a top plan view of a portion of a feeder and showing the invention attached thereto;

Figure 6 is a view similar to the right hand portion of Figure 4 and showing the fiber receiving container in tilted and open position;

Figure 7 is a view of the other end of the fiber receiving container as shown in Figure 6;

Figure 8 is a detail view of the lower portion of Figure 7 and looking from along the line 8—8 in Figure 7;

Figure 9 is a view on an enlarged scale of the fiber receiving container as shown in the lower portion of Figure 3;

Figure 10 is a view similar to Figure 9 but showing the bottom members of the fiber receiving container in opened position;

Figure 11 is an enlarged detail of the graduated end of the weight lever associated with the apparatus.

Figure 12 is a vertical sectional view taken along the line 12—12 in Figure 11;

Figure 13 is a sectional plan view taken along the line 13—13 in Figure 12;

Figure 14 is a modified view of the apparatus using a normally de-energized solenoid;

Figure 15 is a view similar to Figure 14 but showing the solenoid energized to open the bottom doors of the fiber receiving container;

Figure 16 is an elevation of a type of mercury switch employed in the solenoid circuit when using a normally de-energized solenoid;

Figure 17 is an elevation of the type of mercury switch employed on both ends of the fiber receiving containers as shown in Figures 2, 4, and 6;

Figure 18 is a wiring diagram of the apparatus showing the same when the solenoids which actuate the bottom closure members of the fiber receiving containers are normally energized;

Figure 19 is a wiring diagram of the apparatus when the solenoids for actuating the bottom closure members of the fiber receiving containers are normally de-energized.

Referring more specifically to the drawings, the reference characters A, B, C, and D represent a plurality of fiber preparation machines such as what are commonly known as feeders which disintegrate the fibers after they have passed through the bale breakers and the like. These feeders usually further disintegrate the fibers before they are passed to a blending machine or a superior cleaner or other fiber preparation machine to be delivered to the pickers in the picking room. These feeders are identical to each other and a brief description of one will suffice for the other.

Each of the feeders has an electric motor 10 for driving the same, each feeder having a plurality of pulleys 11, 11a, 12, 12a, and 13, connected together by belts 14, 15 and 16, which drive conventional fiber handling mechanism disposed within the feeder housing and also drive conventional elevating mechanism for elevating the disintegrated fibers and dropping them down through the discharge opening 17 of the feeder to suitable conveying apparatus.

Instead of permitting the fibers to fall directly into a suitable conveying apparatus, this invention proposes to hold and weigh these fibers so that a predetermined weight of fibers can be collected into a suitable fiber receiving container and held there and when a predetermined poundage has been received, the feeder will automatically be stopped but the other feeders will continue operation until all of the fiber receiving containers disposed below the discharge openings of the feeders have been filled, at which time the bottoms of the fiber receiving containers will be opened to discharge all of the contents of all of the fiber receiving containers into a suitable conveying mechanism to convey the fibers for further processing.

Rigidly secured to the ends of the outer side walls of the discharge portion of each feeder are the legs 20 and 21 of U-shaped member 22, these being riveted to a suitable bar 23 which in turn is riveted to the side walls of the feeder. This U-shaped member 22 has outwardly projecting stops 24 and 25 secured thereto for purposes to be presently described.

To the legs 20 and 21 are secured downwardly and outwardly projecting members 26 and 27 which project downwardly and outwardly and have pivotally secured as at 28 and 29 respectively on the brackets 26 and 27, legs 32 and 33 of a second U-shaped member 30.

Fixedly secured to leg 32 is a weight lever 34 which is graduated in pounds and ounces as at 35 and is adapted to receive a ring member 36 having a knife edge adapted to fit into the notches 39 in the upper edge of the weight lever 34. The member 36 has a hooked weight member 37 adapted to be hooked in the ring 36 and one or more weights 38 may be placed thereon to cause it to hold a proper amount of poundage within the fiber container to be presently described. The stops 24 and 25, as previously described, are engaged by the member 30 in its up and down movement to limit swinging movement of the member 30.

Pivotally secured to the leg portions 32 and 33 of U-shaped member 30 are downwardly depending links 40 and 41 which have their lower ends rigidly secured to a container 42. This container 42 is balanced on pivot 28 by the addition of suitable weights to the stem of member 37 so that it will take a predetermined number of pounds and ounces of fibers in the container 42 to swing the U-shaped member 30 on its pivot against the weight applied to the member 36.

The upper end of the container 42 is open and is adapted to receive fibers falling from the feed discharge opening 17 of the feeder. The lower end of the container is closed by a pair of swinging doors 45 and 46 whose upper ends are curled around and fixed to rods 47 and 48 respectively, which are pivotally mounted in brackets 50 and 51 and 52 and 53 respectively.

At the end of the container 42, which has the weight lever 34 associated therewith, are secured short arms 55 and 56, connected to the ends of rods 47 and 48, in which pins 57 and 58 are mounted and to these pins are pivotally connected short links 59 and 60 to which the ends of a tension spring 61 are connected.

The spring 61 is very weak and normally has a tendency to pull the bottom closures 45 and 46 to closed positions at all times but a very small quantity of fibers tends to overcome the force of this spring and pushes the bottom closures 45 and 46 open when the electromagnet or solenoid, to be later described, exerting a pulling force to hold the bottom members 45 and 46 in closed position, is de-energized, as it will be observed that even in open position as shown in Figure 6, the spring is still exerting a pressure to move the bottom members 45 and 46 to closed position.

Pivoted to the U-shaped member 30 is the lower end of a link 65 which is pivoted at its upper end to an arm 66 on which is mounted a conventional mercury switch bulb 67, arm 66 being pivoted in a conventional housing 68 as at 69. This bulb 67 has a pair of contacts 70 and 71 disposed on the interior of the bulb adapted to be surrounded by a quantity of mercury 72 when the lever is in the position shown in Figure 17.

Connected to the contacts 70 and 71 are wires 73 and 74 which lead to a conventional box 75 and from this box wires 76 and 77 extend.

When the container 42 receives a predetermined amount of poundage of fibers it will be moved downwardly from the position shown in Figure 4 to the position shown in Figure 6 and will thus break the circuit to the motor 10 due to the fact that the mercury will not be in contact with the contacts 70 and 71 in the bulb 67. The motor circuit will be later explained.

On the other end of the container 42 from the end which has just been described, there is mounted an electrical solenoid 80 which has a core 81 depending therefrom, to which is pivoted a pair of links 82 and 83 which are connected to arms 84 and 85 and fixedly secured on the other ends of the rods 47 and 48 previously described. While the solenoid 80 is energized it holds the bottom members 45 and 46 in closed position as shown in Figure 3, but when de-energized, the weight of the fibers therein will move the bottom members 45 and 46 to the position shown in Figure 10 against the tension of spring 61. The solenoid 80 has leading therefrom, wires 87 and 88.

A mercury switch housing 91 is mounted on a bracket 90 on member 22, which mercury switch is identical to the mercury switch previously described and shown in Figure 17 and which is normally occupying the position shown in Figure 17. Switch housing 91 has wires 92 and 93 leading therefrom. The type of switch shown in Figure 16 is for use with the modified form of the invention shown in Figures 14 and 15. When used with the present form being described, the mercury switch on arm 94 will be identical to the switch shown in Figure 17.

The mercury switch bulb such as described with relation to Figure 17 is mounted on a lever 94 and has a link 95 connected thereto which is pivotally connected as at 96 to the leg 33 of U-shaped member 30. Also mounted on leg 33 is a conventional dash-pot 97 to which is connected a link 98 which in turn is connected to the leg 21 of member 22 which is fixedly secured to the discharge portion of the feeder. This dash-pot is of conventional structure and merely slows down the swinging movement of the member 30 and associated parts.

The above described mechanism is schematically illustrated in Figure 18. In another form of this invention where a normally de-energized solenoid is adapted to be used for emptying the container 42, such a normally deenergized solenoid, as shown in Figures 14 and 15, would be employed in the wiring diagram shown in Figure 19. Here like references will apply and only differences will be noted.

In the form of the invention shown in Figures 14 and 15, the arms 84 and 85, instead of having links 82 and 83 connected thereto, have vertically disposed links 100 and 101 pivotally connected thereto, which at their upper ends are connected to a cross-bar 103. This cross-bar 103 is pivotally connected to core 104 of solenoid 105 which has wires 106 and 107 leading therefrom. These wires lead through a mercury switch 108 disposed in housing 91 which, instead of being of the form shown in Figure 17, is of the form shown in Figure 16 but like reference characters will indicate corresponding parts except that it is to be noted that the contacts 110 and 111 are normally out of contact with the mercury 109 disposed within the mercury tube 108 when the parts are in the position as shown in Figure 14, for example. When the predetermined amount of fibers has been deposited into a container and it is tilted on its pivot and the container 42 tends to move downwardly, the lever 94 will be raised upwardly to therefore energize the solenoid 105 to forceably open the bottom members 45 and 46 to dump the contents from the container 42.

However, in all of the previous description when it is stated that the solenoid will be de-energized to allow the bottom to swing to open position under the weight of the fibers therein or the solenoid will be energized to forceably open the bottom members to allow the fibers to fall from the container 42, this is all predicated upon the fact that this does not immediately happen but only happens when all of the containers in a series have been filled with the predetermined amount of fibers. For example, the container associated with feeder A might be set to tilt at four pounds while that at container B would tilt at six pounds and the container associated with feeder C would tilt at eight pounds and the container associated with feeder D would tilt at ten pounds. When such tilting took place, the motor would be stopped for the feeder when the predetermined amount of fibers have been deposited in its receiving container but the solenoid associated with discharging the contents from the container, or allowing opening of the bottom members 45 and 46, would not function for the reason that this will not take place until all of the containers have been charged to the predetermined amount of fibers to be placed therein according to weight.

Any suitable means may be provided for conveying the discharged fibers 42 to another fiber treating apparatus and in the drawings I have shown an elongated continuous conveyor. This comprises an elongated trough having side-walls 99 and 102 with slats 112 and 113 disposed near the bottom inner side portions thereof. The walls 99 and 102 are supported by legs 119. The sidewalls 99 and 102 have a plurality of brackets 114 and 115 in which upper rollers 116 are mounted and also lower rollers 117. The upper rollers are designed to support the upper portion of an endless belt 118 and the lower rollers 117 are designed to support the return portion of this belt 118. This belt, at its ends, is mounted on rollers 120 and 121 and roller 121 is driven by a suitable belt 122 driven by a motor 123 to discharge the dumped fibers into a fiber preparation machine 124 which may be a superior cleaner or any other suitable fiber treating apparatus. This fiber treating apparatus 124 is operated on call from picker room and likewise the feeders are operated on call from the fiber preparation machine 124 to supply the necessary amount of fibers to the picker room.

In all forms of the invention except in the modified form shown in Figures 14, 15 and 19, the switches broadly designated by reference characters 68 and 91 which indicate their housings, while the containers are receiving fibers, are in closed position and as previously described, wires 76 and 77 extend from the switch in housing 68 and wires 92 and 93 extend from the solenoid controlling the switch in housing 91. Wire 77, which leads to one side of switch in housing 68, is connected to a master wire 126 which leads to a source of electrical energy 127. A wire 128 leads from the other side of this source of electrical energy and this wire 128 has branch wires 129 which lead to the motors 10. Wire 76 is connected to the other side of motors 10. The wires 87 which lead from solenoids 80 are connected to a wire 130. This wire 130 is connected to wire 93 which leads to one of the contacts of mercury switch in housing 91. Wire 130 has no other connections. Wires 92 leading from the other side of mercury switches in housings 91 are connected to a wire 131 connected to one side of a source of electrical energy 132. Leading from the other side of the source of electrical energy 132 is a wire 133 which is connected to the wires 88 leading to the other side of the solenoids 80.

When a container 42 has received its given charge of fibers and is swung on its pivot to the position shown in Figure 6, the switch 67 in housing 68 will be moved to open position to stop the motor. Also the similar switch in housing 91 controlling the solenoid 80 for that machine will be opened but current will still flow through all of the solenoids, through wires 133, 130, and through any unopened switches in housings 91, back to the source of current 132 through wire 131.

When the last of the plurality of machines has delivered its charge to its container and this container is moved downwardly, it then opens the last of the switches in housings 91 which de-energizes all of the solenoids 80 and allows the fibers in all of the containers 42 to be simultaneously dumped into the conveyor. When the weight of the contents have been relieved from the swinging bottoms 45 and 46 of a fiber receiving container, the tension spring 61 will move these bottoms to closed position which will automatically close mercury switches in housings 68 and 91 and all machines will be started again.

In that form of invention shown in Figures 14, 15 and 19, where the solenoids 105 remain de-energized during the filling of the containers, the housing 91 would have a mercury bulb therein, similar to that shown at 108 in Figure 16 and the spring 61 would be much stronger to cause it to positively hold the bottoms 45 and 46 in closed position.

The wiring diagram in Figure 19, as to the motors 10, would be the same as described in Figure 18, but in this case, by referring to Figure 19, it will be seen that with switch 108 open there would be no current going to any of the solenoids 105. Wire 106 from each of the solenoids 105 leads to a wire 135 which is connected to one side of a source of electrical energy 136. A wire 137 and branch wires 107 lead to the other side of all of the solenoids 105. This wire 137 leads to one side of switch 108 on machine A, and a wire 138 leads from the other side of switch 108 on machine A to one side of the switch 108 on machine B, and wire 139 leads from the other side of switch 108 on machine B to one side of the switch 108 on machine C, and wire 140 leads from the other side of switch 108 on machine C to one side of switch 108 on machine D, and a wire 141 leads from the other side of switch 108 on machine D to the other side of the source of electrical energy 136.

Now let us assume that containers 42 associated with one or all of machines A, B and C have moved downwardly to close switches 108. Still no current can get to wire 141 until the last machine, which let us say, will be in machine D, has filled its container to the predetermined poundage and caused it to swing downwardly. This will close switch 108 on machine D and thus establish a circuit through all of the switches 108 to energize all of the solenoids 105 to forceably push the doors 45 and 46 open to discharge the contents. Being relieved of the weight of the fibers in the containers, the containers will swing back to normal position which will open all switches 108 to de-energize the solenoids 105 and spring 61 would then close all of the doors 45 and 46. This return of the containers to normal position will close all of the switches in housings 68 in the motor circuits and start all of the machines in operation.

In the drawings and specification, there has been set forth a preferred embodiment of the invention, and although specific terms are employed, they are used in a generic and descriptive sense only and not for purposes of limitation, the scope of the invention being defined in the claims.

We claim:

1. Means for blending a plurality of different fibers together comprising a plurality of fiber handling machines, fiber receiving means associated with each of the fiber handling machines for receiving and holding fibers discharged from each machine, means operable by the weight of the fibers in the receiving means for stopping the machine associated with the receiving means when a predetermined amount of fibers has been collected in the fiber receiving means, and means automatically operable for discharging the fibers from all of the fiber receiving means when all of the receiving means have been charged with their predetermined weights of fibers.

2. Fiber blending apparatus comprising a plurality of fiber preparation machines, each having individual means for driving the same and each having a discharge opening, a fiber receiving container disposed below each of the discharge openings for receiving the fibers discharged from the machines, means operable by the weight of the fibers in each container associated with each machine for stopping the machine with which a container is associated when a predetermined weight of fibers is received into the container, and means automatically operable when all of the containers have received their predetermined weight of fibers therein for automatically discharging the fibers from the containers.

3. Apparatus for conditioning fibers comprising a plurality of fiber preparation machines, each machine having a discharge opening, a container disposed below each of the openings and adapted to receive fibers passing through the machine, means operable by the weight of the fibers in a container when a predetermined weight of fibers is deposited into the container for automatically stopping the machine associated with a particular container, and means automatically operable when all of the containers are charged with predetermined amounts of fibers for automatically discharging all of the fibers from all of the containers and for again activating all of the machines for the reception of additional batches of fibers.

4. Fiber preparation machinery comprising a plurality of fiber processing machine, each having a discharge opening from whence the fibers are discharged, each opening having a container disposed therebelow and each container being provided with a swingable bottom member, means automatically operable when a predetermined poundage of fibers has been deposited in a container for stopping the machine associated with that container and means automatically operable when all of the containers have been filled with a predetermined poundage for automatically moving all of the swingable bottoms and discharging the fibers simultaneously from all of the containers and means automatically operable after the fibers have been discharged from all of the containers for closing the bottoms of the containers ready for the reception of additional batches of fibers, and means operable automatically when the fibers are dumped for starting all of the machines.

5. In fiber preparation machinery comprising a plurality of machines for processing fibers, each machine having a discharge opening, a container disposed below the discharge opening and pivoted for vertical swinging movement, weighted means for restraining the container against pivotal movement until a predetermined amount of fibers are deposited therein, said container having a movable bottom adapted to be moved to open to allow fibers to fall from the container, a switch mounted on the machine and connected to the pivoted container, an electric motor for driving the machine, a circuit for said electrical motor passing through the switch, downward movement of the container upon receiving a predetermined poundage of fibers serving to open the switch and stop the motor for that particular machine, a solenoid mounted on each container and connected to the bottom member for operating the same, a switch associated with each solenoid member, a second electrical circuit connected to all of said second named solenoids, a connection between the container and the said second switches whereby upon downward movement of a container upon receiving a predetermined poundage of fibers the switch associated with the second solenoid on a machine will be broken, the downward movement of the last of a plurality of containers serving to open the circuit through all of the second solenoids to thereby allow the weight of the fibers to open the bottom members and fall simultaneously from all of the containers, the containers then automatically swinging to normal position on their pivot and also moving the two switches associated therewith to closed position to activate the motors of all the machines and to activate the solenoids associated with the containers for forcibly moving the bottoms of the containers to closed position.

6. Apparatus for blending fibers comprising a plurality of fiber processing machines, each having a discharge outlet, a container disposed below each of the discharge outlets for catching and retaining the fibers passing through each machine, means controlled by the weight of fibers in a container for stopping the machine with which the container is associated when a predetermined weight of fibers is deposited in its container, and means automatically operable when all of the containers have their predetermined weight of fibers deposited therein, for automatically and simultaneously discharging the fibers from the containers.

7. Apparatus for blending fibers comprising a plurality of fiber processing machines, each having a discharge outlet, a container disposed below each of the discharge outlets for catching and retaining the fibers passing through each machine, means controlled by the weight of fibers in a container for stopping the machine with which the container is associated when a predetermined weight of fibers is deposited in its container, and means automatically operable when all of the containers have their predetermined weight of fibers deposited therein, for automatically discharging the fibers from the containers.

OREN W. GREENE.
ROBERT W. TWITTY.
THERMAN L. RICHIE.